(12) United States Patent
Asgekar et al.

(10) Patent No.: US 12,406,497 B2
(45) Date of Patent: Sep. 2, 2025

(54) EMOTION AND ACTION TRACKING AND TRACKING FOR VIDEO CONFERENCING

(71) Applicant: Pencil Learning Technologies, Inc., Palo Alto, CA (US)

(72) Inventors: Amogh Asgekar, Palo Alto, CA (US); Ayush Agarwal, San Francisco, CA (US)

(73) Assignee: Pencil Learning Technologies, Inc., Palo Alto, CA (US)

( * ) Notice: Subject to any disclaimer, the term of this patent is extended or adjusted under 35 U.S.C. 154(b) by 312 days.

(21) Appl. No.: 17/984,145

(22) Filed: Nov. 9, 2022

(65) Prior Publication Data

US 2023/0147584 A1 May 11, 2023

Related U.S. Application Data

(60) Provisional application No. 63/278,058, filed on Nov. 10, 2021.

(51) Int. Cl.
*G06V 10/82* (2022.01)
*G06V 20/40* (2022.01)
*G06V 40/10* (2022.01)
*H04L 65/403* (2022.01)

(52) U.S. Cl.
CPC ............. *G06V 20/41* (2022.01); *G06V 10/82* (2022.01); *G06V 20/46* (2022.01); *G06V 40/10* (2022.01); *H04L 65/403* (2013.01)

(58) Field of Classification Search
None
See application file for complete search history.

(56) References Cited

U.S. PATENT DOCUMENTS

| | | | |
|---|---|---|---|
| 2013/0300900 A1* | 11/2013 | Pfister | G06V 40/176 348/239 |
| 2014/0201126 A1* | 7/2014 | Zadeh | A61B 5/165 706/52 |
| 2017/0238860 A1* | 8/2017 | el Kaliouby | G16H 50/30 |
| 2019/0034706 A1* | 1/2019 | el Kaliouby | H04N 21/4223 |
| 2020/0350057 A1* | 11/2020 | el Kaliouby | G16H 40/67 |
| 2021/0133509 A1* | 5/2021 | Wall | G06F 18/285 |
| 2021/0247846 A1* | 8/2021 | Shriram | G06T 19/006 |
| 2021/0334547 A1* | 10/2021 | Cohen-Tidhar | G06V 10/82 |
| 2023/0081918 A1* | 3/2023 | Kandukuri | G06V 40/166 705/18 |

* cited by examiner

*Primary Examiner* — Idowu O Osifade
(74) *Attorney, Agent, or Firm* — Pierson Ferdinand LLP; Daniel Rose

(57) ABSTRACT

The present disclosure provides systems and methods for extraction of nonverbal communication data from video. A system can include a computing device comprising a processor and a camera. The system can retrieve, from a camera of the computing device, a video stream of a user. The system can select a plurality of individual frames of the video stream. For each of the plurality of individual frames of the video stream, the system can extract a plurality of features and identify, from the extracted plurality of features, a pose of the user. The system can classify, via a neural network from the identified poses of the user for the plurality of individual frames of the video stream, the video stream as showing one of a predetermined plurality of states.

16 Claims, 7 Drawing Sheets

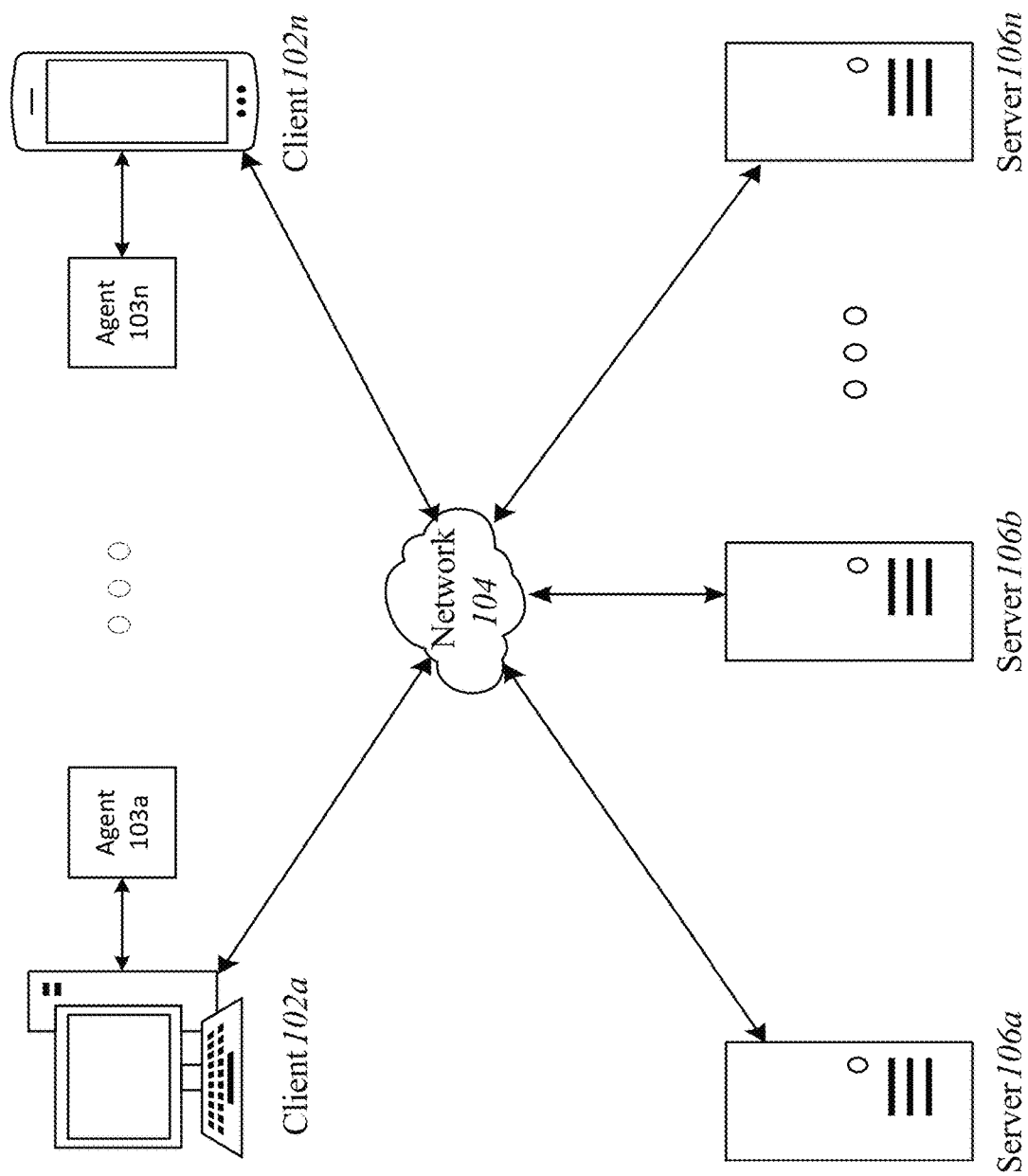

EMOTION AND ACTION TRACKING AND TRACKING FOR VIDEO CONFERENCING

RELATED APPLICATIONS

The present application claims the benefit of and priority to U.S. Provisional Patent Application No. 63/278,058, entitled "Emotion and Action Tracking and Tracking for Video Conferencing," filed Nov. 10, 2021, the entirety of which is incorporated by reference herein.

BACKGROUND

Educators can deliver online lectures via video conference calls. Participants can enable their cameras to express their attention and provide feedback to the educators (e.g., hand raises or thumbs up). However, it can be challenging to detect the participants' engagement and comprehension during lectures, especially with sizable participation.

SUMMARY

Educators can deliver educational content online through video conferences or screen-sharing applications to replicate the live experience in a classroom. While these applications provide video stream delivery, they may lack the modalities desired by educators to obtain real-time feedback from participants by observing them closely. In particular, conventional video lectures can pose challenges in both the approach taken by educators to deliver content and the motivation or interest levels of participants consuming the content. Hence, with conventional video streaming applications, the otherwise real-time or interactive learning experience received via an application is rendered similar to participants watching a video recording or the educators pre-recording the content. The systems and methods of this technical solution provide educators with smart virtual tutoring assistance ("TA") that monitors participants' video feeds and runs semantic video analysis on the video feeds.

The TA can detect, for each participant, whether a participant is present, attentive, providing gestures, expression of emotions, among other recorded characteristics (e.g., with or without video recording of participant available to the educator). The TA can aggregate the semantic information from one or more feeds and display the aggregated information on a dashboard for consumption by the educator. Further, the TA can shift focus to one or more participants responsive to one or more recorded actions, such as bringing forward video feeds of participants raising their hands for questions. The TA can leverage a machine learning model (e.g., running in-browser on client-side) trained using high-quality corpus of face action units. Using the machine learning model, the TA can generate an intermediate representation of the video feed that can output structured information, process the structured information, and generate action unit classifications. Accordingly, the systems and methods described herein can enable educators to automatically receive feedback from participants viewing the video stream, decrease latency for pose identification during video stream, increase engagement of participants, and improve the online learning experience with educators responding to the feedback from participants.

At least one aspect of the present disclosure is directed to a method for extraction of nonverbal communication data from video. The method can be performed, for example, by one or more processors of a computing device coupled to memory. The method can include retrieving, by a processor of the computing device from a camera of the computing device, a video stream of a user. The method can include selecting, by the processor, a plurality of individual frames of the video stream. For each of the plurality of individual frames of the video stream, the method can include extracting, by the processor, a plurality of features, and identifying, by the processor from the extracted plurality of features, a pose of the user. The method can include classifying, by the processor via a neural network from the identified poses of the user for the plurality of individual frames of the video stream, the video stream as showing one of a predetermined plurality of states.

To retrieve the video stream of the user, the method can include retrieving the video stream from one of a camera connected to the computing device and a camera connected to a remote computing device. To select the plurality of individual frames of the video stream, the method can include downsampling the video stream at a predetermined rate, and selecting the plurality of individual frames from consecutive frames of the downsampled video stream. To extract the plurality of features, the method can include processing each frame of the plurality of individual frames with a convolutional neural network. To extract the plurality of features, the method can include performing an edge detection and dimensional reduction on each frame of the plurality of individual frames.

To identify the pose of the user, the method can include identifying, from the extracted plurality of features for a frame of the plurality of individual frames, a plurality of points corresponding to physical features of the user at identified positions within the frame. To classify the video stream as showing one of the predetermined plurality of states, the method can include providing an array comprising identified positions of points corresponding to a physical feature of the user for each of the plurality of individual frames to the neural network, and identifying a highest scoring state of the plurality of states from output values of the neural network. To classify the video stream as showing one of the predetermined plurality of states, the method can include providing a plurality of arrays comprising identified positions of points corresponding to different physical features of the user for each of the plurality of individual frames to a corresponding plurality of neural networks. Further, the method can include identifying a highest scoring state of the plurality of states from aggregated output values of the plurality of neural networks. The method can include providing an identification of the classified state of the video stream to a remote computing device. In some cases, the video stream may not be provided to the remote computing device.

At least one other aspect of the present disclosure is directed to a system for extraction of nonverbal communication data from video. The system can include a computing device comprising a processor and a camera. The camera can be configured to capture a video stream of a user. The system can include the processor configured to select a plurality of individual frames of the video stream. For each of the plurality of individual frames of the video stream, the system can include the processor configured to extract a plurality of features and identify, from the extracted plurality of features, a pose of the user. The system can include the processor configured to classify, via a neural network from the identified poses of the user for the plurality of individual frames of the video stream, the video stream as showing one of a predetermined plurality of states.

The system can include the processor configured to downsample the video stream at a predetermined rate, and select the plurality of individual frames from consecutive frames of the downsampled video stream. The system can include the processor configured to process each frame of the plurality of individual frames with a convolutional neural network. The system can include the processor configured to perform an edge detection and dimensional reduction on each frame of the plurality of individual frames. The system can include the processor configured to identify, from the extracted plurality of features for a frame of the plurality of individual frames, a plurality of points corresponding to physical features of the user at identified positions within the frame. The system can include the processor configured to provide an array comprising identified positions of points corresponding to a physical feature of the user for each of the plurality of individual frames to the neural network, and identify a highest scoring state of the plurality of states from output values of the neural network.

The system can include the processor configured to provide a plurality of arrays comprising identified positions of points corresponding to different physical features of the user for each of the plurality of individual frames to a corresponding plurality of neural networks. The system can include the processor configured to identify a highest scoring state of the plurality of states from aggregated output values of the plurality of neural networks. The system can include the processor configured to provide an identification of the classified state of the video stream to a remote computing device. In some cases, the video stream may not be provided to the remote computing device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g., disks) or intangible carrier media (e.g., communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an embodiment of a network environment comprising a client device in communication with a server device;

DETAILED DESCRIPTION

Figure 1B:
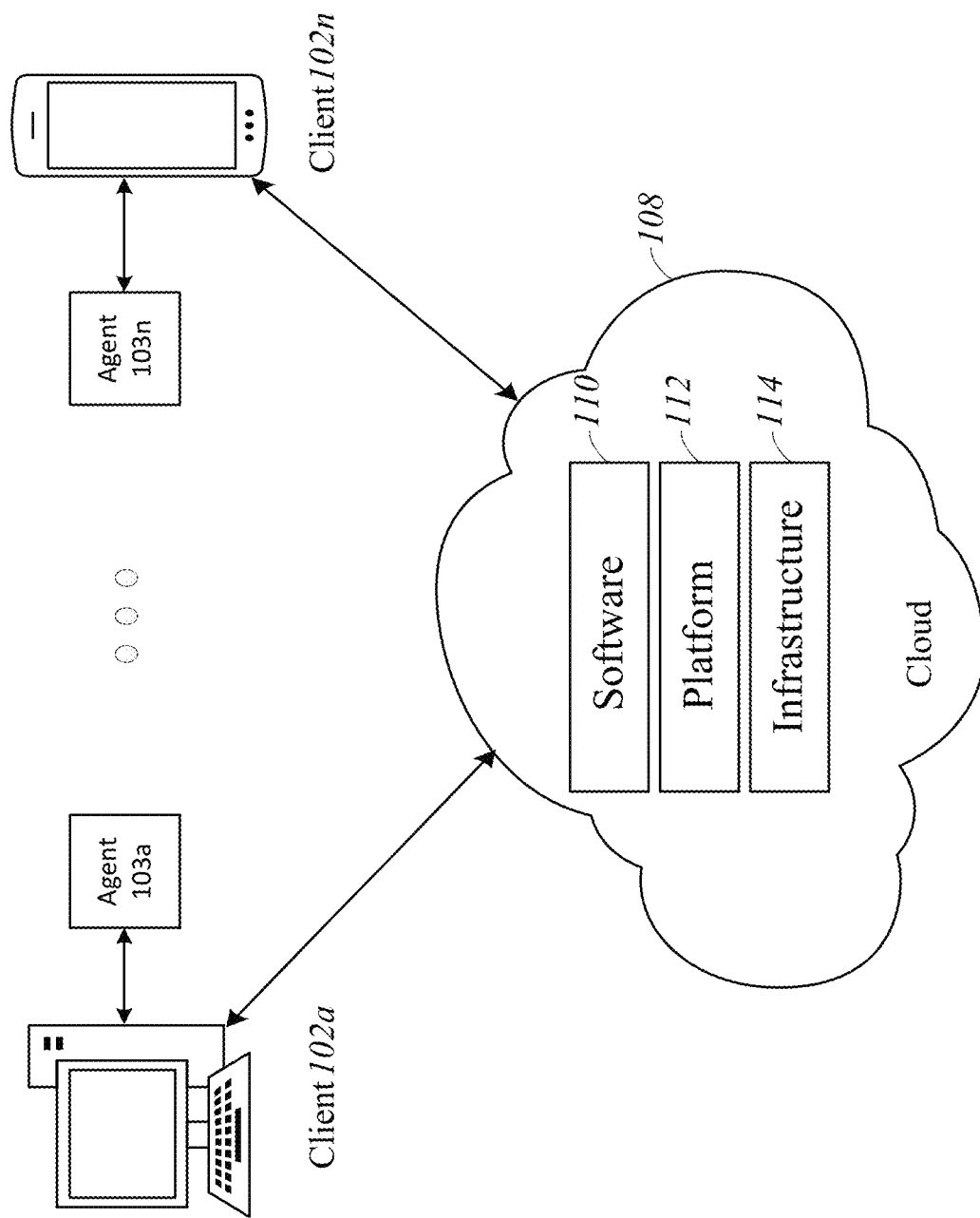
FIG. 1B is a block diagram depicting a cloud computing environment comprising a client device in communication with cloud service providers.

Below are detailed descriptions of various concepts related to, and implementations of, techniques, approaches, methods, apparatuses, and systems for generating and formatting multiple teaching media. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for extraction of nonverbal communication data from video.

A. Computing and Network Environment

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generations of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g., Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, server 106 may be referred to as a remote machine or a node. In another embodiment, a plurality of nodes 290 may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
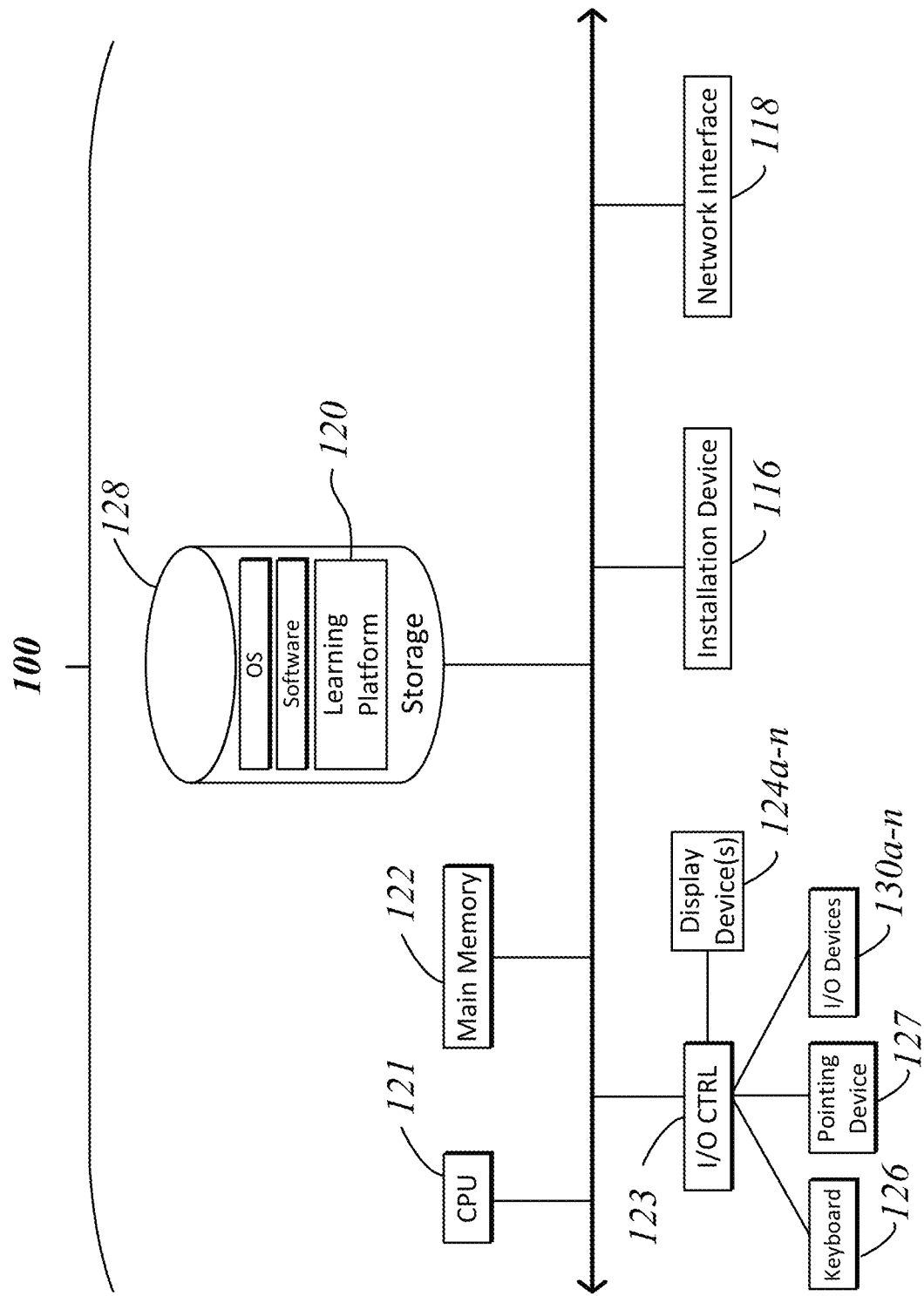
FIGS. 1C and 1D are block diagrams depicting embodiments of computing devices useful in connection with the methods and systems described herein.
Figure 1D:
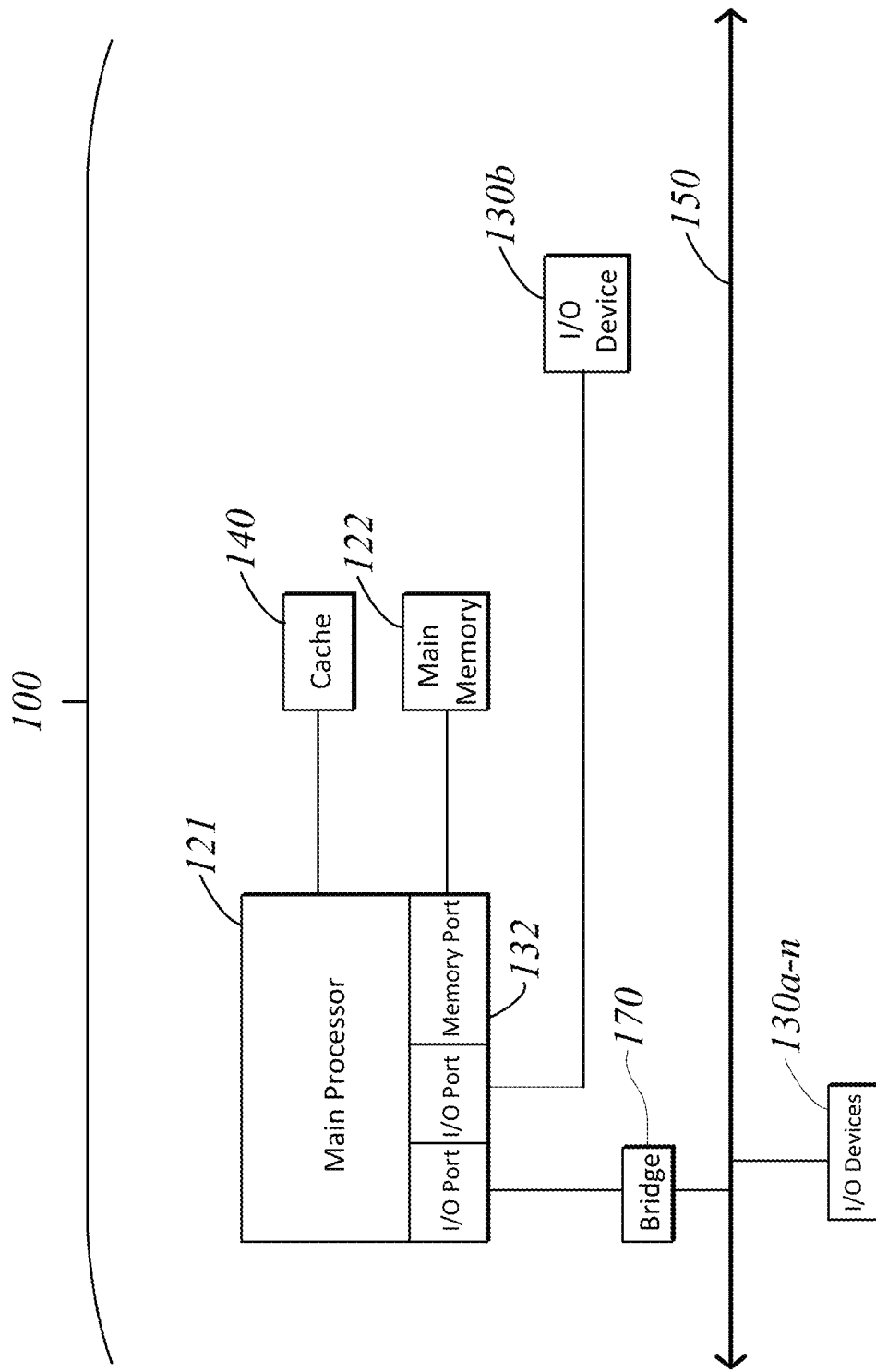

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g., a mouse. The storage device 128 may include, without limitation, an operating system, software, and learning platform 120, which can implement any of the features of the educational content system 205 described herein below in conjunction with FIG. 2. As shown in FIG. 1D, each computing device 100 may also include additional optional elements, e.g., a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the learning platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include applications developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, XBOX ONE X, XBOX SERIES S, or an XBOX SERIES X device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g., the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g., the KINDLE family of devices by Amazon.com, or the NOOK family of devices by Barnes & Noble, Inc. of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Extracting Nonverbal Communication Data from Video

The systems and methods of this technical solution provide techniques for extraction of nonverbal communication data from video. While educators can deliver educational content online, such as through video conferences in attempts to replicate live experiences in a classroom, these applications may lack the modalities desired by educators to obtain real-time feedback from participants by observing them closely. In particular, conventional video lectures can pose challenges in both the approach taken by educators to deliver content and the motivation or interest levels of participants consuming the content. Hence, with conventional video streaming applications, the otherwise real-time or interactive learning experience received via an application is rendered similar to participants watching a video recording or the educators pre-recording the content.

The systems and methods of this technical solution provide educators with smart virtual TA that can extract and analyze nonverbal communication data from video feeds.

The systems and methods can detect, for each participant, whether a participant is present, attentive, providing gestures, expression of emotions, among other recorded characteristics (e.g., with or without video recording of participant available to the educator). The systems and methods can aggregate the semantic information from one or more feeds and display the aggregated information on a dashboard for consumption by the educator. The systems and methods can shift focus to one or more participants responsive to one or more recorded actions, such as bringing forward video feeds of participants raising their hands for questions. The systems and methods can leverage a machine learning model (e.g., running in-browser on client-side) trained using high-quality corpus of face action units. The systems and methods can generate, using the machine learning model, an intermediate representation of the video feed that can output structured information, process the structured information, and generate action unit classifications. Accordingly, the systems and methods described herein can enable educators to automatically receive feedback from participants viewing the video stream, decrease latency for pose identification during video stream, increase engagement of participants, and improve the online learning experience with educators responding to the feedback from participants.

In some cases, the systems and methods can capture the expression, pose, or gesture of participants without receiving video feeds from the participants. For example, due to a low-quality internet connection, one or more participants can disable sending video feeds to an application. However, the participants can maintain the enabled camera to provide feedback to the application. The systems and methods can capture the expressions and poses (e.g., nonverbal communication) of the participants and provide the states of the participants as feedback to the educator. Once the nonverbal communication data has been captured and provided in the application (and displayed to the educator), the systems and methods can discard other data captured via the camera of the participant, such as background information. Hence, the systems and methods can provide an ability to track a participant's engagement based on facial/body cues without requiring the participant to transmit video data packages to the application, thereby, enhancing the privacy of the user (e.g., background or other visualization of the participant is not shared) and reducing resource consumption.

The systems and methods can perform the technical solution herein on the client-side. By performing the features on the client-side, the systems and methods can extract nonverbal communication data from one or more video feeds at decreased latency to provide educators with real-time feedback. The systems and methods can perform the technical solution herein without limitation to the number of participants, increasing the scalability of the systems. The systems and methods can include an in-browser machine learning model to process video data thereby enabling portability of the technical solution described herein, such as across any devices including at least smartphones, tablets, desktop, or browsers on a desktop. The systems and methods can decrease resource consumption by training classifiers based on a predetermined set of points, which are indicators of poses or expressions of one or more participants, thereby reducing the training data set (e.g., eliminating training data set of full faces).

Figure 2:
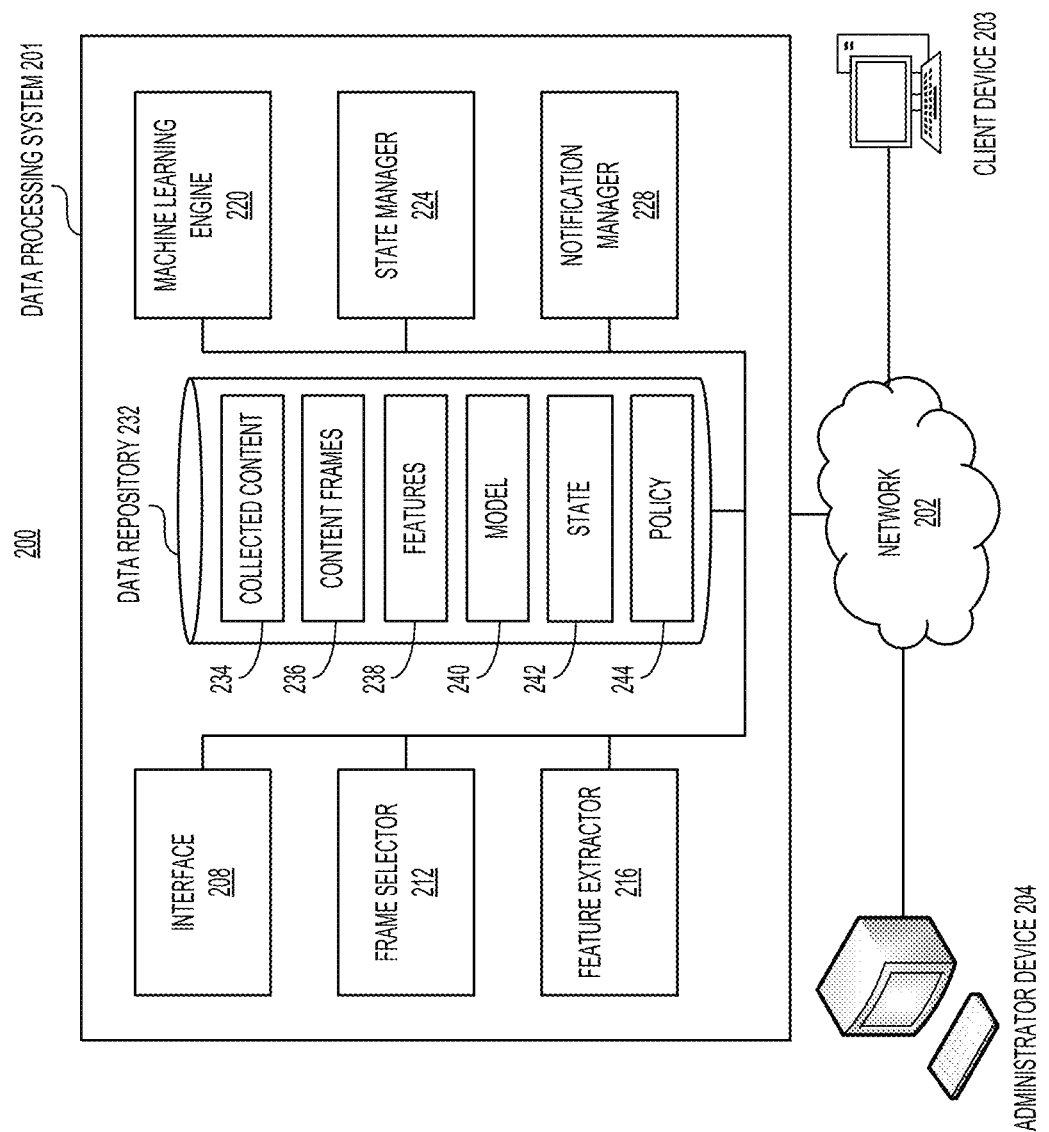
FIG. 2 is a block diagram of an example system for extraction of nonverbal communication data from video, in accordance with one or more implementations.

Referring now to FIG. 2, illustrated is a block diagram of an example system 200 for extraction of nonverbal communication data from video, in accordance with one or more implementations. The system 200 can include a data processing system 201, a network 202, a client device 203, and an administrator device 204. The system 200 can include one or more similar or other components, such as one or more data processing systems 201, one or more networks 202, one or more client devices 203, or one or more administrator devices 204. The data processing system 201 can be referred to as an emotion and action tracking system, a smart virtual TA, or an educational assistance system.

The data processing system 201 can be a remote computing device, a cloud computing device, or a server. The data processing system 201 can connect to one or more computing devices, such as the client device 203 or the administrator device 204 via the network 202. The data processing system 201 can include one or more processors and memories. The data processing system 201 can include one or more components to extract and analyze nonverbal communication data from one or more video feeds. The data processing system 201 indicates one or more states or poses of one or more participants associated with a client device 203 to the educator of the administrator device 204. In some cases, the system 200 can include a second remote computing device with one or more components similar to the data processing system 201. In this case, the data processing system 201 can delegate at least one task to the second remote computing device to extract, analyze, and interpret the nonverbal communication data. For example, the data processing system 201 can process and analyze video feeds from the client device 203. After processing and analyzing the video data, the data processing system 201 can transmit the processed data to a second remote computing device to determine the state of at least one participant using the client device 203. Accordingly, the second remote computing device can indicate the state of the participant to the administrator device 204, for example, via the application used for providing online educational content. The data processing system 201 can process and analyze video feeds of each client device 203 through the in-browser application running on the client-side (e.g., an internet browser of the client device 203 or the administrator device 204).

The data processing system 201 can train a machine learning model for execution on the client-side, such as on the client device 203 or the administrator device 204. The data processing system 201 can be an intermediary between all devices within the system 200, such as between one or more client devices 203 and the administrator device 204. While executing on the browser of a client device 203 (or administrator device 204), the data processing system 201 can retrieve, receive, or transmit data packages through the browser to or from the devices. These data packages can be processed and analyzed to output data to a designated device within the system 200, such as transmitting an expression of the user of the client device 203 to the administrator device 204, displayed as an icon.

The network 202 can include computer networks such as the Internet, local, wide, metro or other area networks, intranets, satellite networks, other computer networks such as voice or data mobile phone communication networks, and combinations thereof. The data processing system 201 can communicate via the network 202, for example, with at least one client device 203 or at least one 204. The network 202 may be any form of computer network that can relay information between the data processing system 201, the client device 203, the administrator device 204, and one or more information sources, such as web servers or external databases, amongst others. The network 202 can include the Internet and/or other types of data networks, such as a local area network (LAN), a wide area network (WAN), a cellular network, a satellite network, or other types of data networks. The network 202 can include any number of computing devices (e.g., computers, servers, routers, network switches, etc.) that are configured to receive and/or transmit data within the network 202. The network 202 can include any number of hardwired and/or wireless connections. Any or all of the computing devices described herein (e.g., the data processing system 201, the client device 203, the administrator device 204, the computer system 100, etc.) can communicate wirelessly (e.g., via WiFi, cellular, radio, etc.) with a transceiver that is hardwired (e.g., via a fiber optic cable, a CAT5 cable, etc.) to other computing devices in the network 202. Any or all of the computing devices described herein can communicate wirelessly with the computing devices of the network 202 via a proxy device (e.g., a router, network switch, or gateway). In some implementations, the network 202 can be similar to or can include the network 104 or the cloud 108 described herein above in conjunction with FIGS. 1A and 1B.

The client device 203 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client device 203 can include one or more computing devices or servers that can perform various functions as described herein. The one or more client device 203 can include any or all of the components and perform any or all of the functions of the computer system 100 described herein in conjunction with FIGS. 1A-1D. The client device 203 can be, or can be similar to, the client devices 102 described herein above in conjunction with FIGS. 1A-1D.

The client device 203 can include, but is not limited to, a television device, a mobile device, smart phone, personal computer, a laptop, a gaming device, a kiosk, or any other type of computing device. The client device 203 can be implemented using hardware or a combination of software and hardware. The client device 203 can include a display device that can provide visual information, such as information presented as a result of executing instructions stored in the memory of the client device 203. The display device can include an liquid-crystal display (LCD) device, an organic light-emitting diode (OLED) display, a light-emitting diode (LED) display, a bi-stable display (e.g., e-ink, etc.), amongst others. The display device can present one or more user interfaces to various regions of the display in accordance with the implementations described herein. In some implementations, the display device can include interactive elements, such as a capacitive or resistive touch sensor. Thus, the display device can be an interactive display (e.g., a touchscreen, a display, etc.), and can include one or more input/output (I/O) devices or interfaces. The client device 203 can further include or be in communication with (e.g., via a communications bus coupled to the processors of the client device 203, etc.) one or more input devices, such as a mouse, a keyboard, or digital key pad, among others. The display can be used to present one or more applications as described herein, such as web browsers or native applications. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the client device 203. The interactions can result in interaction data, which can be stored and transmitted by the processing circuitry of the client device 203 to other computing devices, such as those in communication with the client device 203. The interaction data can include, for example, interaction coordinates, an interaction type (e.g., click, swipe, scroll, tap, etc.), and an indication of an actionable object with which the interaction occurred. Thus, each client device 203 can enable a user to interact with and/or select one or more actionable objects presented as part of graphical user interfaces to carry out various functionalities as described herein.

The client device 203 can each execute one or more client applications, which can be a web browser or native application that presents educational content or video presentation shared by the administrator device 204. The one or more client applications can cause the display device of one or more client device 203 to present a user interface that includes educational content, such as presentation slides, video feeds, word documents, online questions, or electronic textbooks, among others. The application can be a web application (e.g., in communication with the data processing system 201 to extract nonverbal communication data.), a native application, an operating system resource, or some other form of executable instructions. In some implementations, the client application can include a local application (e.g., local to a client device 203), hosted application, Software as a Service (SaaS) application, virtual application, mobile application, and other forms of content. In some implementations, the application can include or correspond to applications provided by remote servers or third party servers. The client device 203 can include a camera used to capture images or videos of the user. The client device 203 can transmit video data (e.g., video feeds) to the data processing system 201. The client device 203 can enable the data processing system 201 (e.g., executing via an in-browser application on the client-side) to process and analyze the video data. The client device 203 can transmit instructions to the data processing system 201 to disable video sharing while sharing the state of the user accessing the client device 203.

In some implementations, the application can access a database stored on the server or the data processing system 201, and generate a user interface for display on the client device 203 or other devices, such as the administrator device 204. In some implementations, the user interface can include one or more actionable objects. In some implementations, the user interface can include one or more states of the user of the client device 203. The user interface can be presented to other devices accessing the same application as the client device 203, such as accessing a conference call link or dialed into the application. In some cases, the client device 203 can share camera feeds enabled by the user to the other devices. In some other cases, via interactions from the user, the client device 203 can disable sharing of the camera feeds while enabling the camera to share static or animated gestures or emotions of the user captured via the camera. For example, to maintain the privacy of the surrounding environment, the user can interact with the client device 203 to disable video sharing. The client device 203 can transmit instructions to the data processing system 201 not to share the camera recording. Instead, based on the instructions from the client device 203, the data processing system 201 can process the frames of the recording to provide an indication of the user's state to at least one other device, such as the administrator device 204 to improve quality of the educational content or lecture, reduce resource consumption (e.g., processing via client-side in-browser application), and maintain the privacy of the user.

In some implementations, one or more client devices 203 can establish one or more communication sessions with the data processing system 201. The one or more communication systems can each include an application session (e.g., virtual application), an execution session, a desktop session, a hosted desktop session, a terminal services session, a browser session, a remote desktop session, a URL session and/or a remote application session. The client device 203 can execute the features and functionalities of the data processing system 201 via in-browser application or an application installed locally on the client device 203 (e.g., application can connect to other devices within the system 200). Each communication session can include encrypted and/or secure sessions, which can include an encrypted file, encrypted data or traffic.

The administrator device 204 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The administrator device 204 can include one or more computing devices or servers that can perform various functions as described herein. The administrator device 204 can include any or all of the components and perform any or all of the functions of the computer system 100 described herein in conjunction with FIGS. 1A-1D. The administrator device 204 can be, or can be similar to, for example, the client devices 102 described herein above in conjunction with FIGS. 1A-1D.

The administrator device 204 can be substantially similar to one or more of the client device 203 described herein above, and can include any of the hardware components of the client device 203, as well as perform any of the functionalities of the client device 203 as described herein. In addition, the administrator device 204 can communicate with the data processing system 201 to receive video data from at least one client device 203. The administrator device 204 can perform other features and functionalities similar to the client device 203, as described above. The administrator device 204 can access an application similar to the client device 203. The administrator device 204 can access the application with administrator privileges. For example, the administrator device 204 can control one or more features and functionalities of the application accessed by the client device 203. The administrator device 204 can receive at least the video feeds retrieved from the camera of the client device 203 (e.g., if the user of the client device 203 enabled video sharing). In some cases, the administrator device 204 may not receive video feeds from the client device 203, e.g., if the user of the client device disabled video sharing. Although video sharing is disabled, the administrator device 204 can receive a state indicator (e.g., poses, emotion, expression, or gesture in static or animated icon) of one or more participants using one or more client devices 203 with disabled video sharing. The client device 203 can enable expression sharing features prior to or during access to the application. The expression sharing features can be referred to as or used interchangeably with other descriptive terms, such as nonverbal communication sharing, gesture sharing, or user icon sharing.

The administrator device 204 can configure one or more settings of the application. For example, the administrator device 204 can set one or more participation requirements for one or more client devices 203 to access the session within the application (e.g., requirements for the user to join a conference call or lecture video stream). The participation requirement can include enabling video recording, video sharing, or expression sharing, for example. In another example, the administrator device 204 can instruct the data processing system 201 to inform or request one or more users of one or more client devices 203 to enable video sharing or expression sharing (e.g., without making those options requirements). The data processing system 201 may transmit a notification to the user requesting that at least one of the video-sharing or icon sharing features be enabled. However, the administrator device 204 can allow the client device 203 to participate in the application without the aforementioned sharing features. In some cases, the administrator device 204 can remove any restrictions or requirements for participation in the lecture or the educational video stream.

The administrator device 204 can display a user interface of an application similar to the client device 203, such as during the video stream or lecture. The administrator device 204 can display one or more icons of participants' expressions. These icons can also be presented to one or more client devices 203. The administrator device 204 can provide instructions to the data processing system 201 to enable or disable the icon sharing, such as to the client device 203. The administrator device 204 can enable or disable receiving the icon sharing on the interface of the display of the administrator device 204. In some cases, the administrator device 204 can configure the user interface of the application accessed by the client devices 203. The administrator device 204 can disable video sharing while enabling the detected expression icon, thereby maintaining the privacy of the participants accessing the application. The application can be accessed via shared-link, room number, password, or other access codes.

The data processing system 201 can include one or more components for extracting and analyzing nonverbal communication data from video of at least one client device 203. The data processing system 201 can include at least an interface 208, a frame selector 212, a feature extractor 216, a machine learning engine 220, a state manager 224, a notification manager 228, or a data repository 232. The data repository 232 can include one or more data structures to store information received or retrieved from other devices or processed/analyzed by the components of the data processing system 201. The data repository 232 can include at least collected content 234 data structure, content frames 236 data structure, features 238 data structure, model 240 data structure, state 242 data structure, and policy 244 data structure. The data repository 232 can be accessed by one or more components of the data processing system 201 or one or more devices within the system 200, such as the client device 203 or the administrator device 204.

The collected content 234 data structure can store information from one or more client device 203 or an administrator device 204 accessing an application (e.g., video streaming application, content sharing application, or other applications capable of sharing screens or camera feeds with other computing devices). The collected content 234 can be referred to as video storage, content database, or camera feed storage. The collected content 234 can include video data (e.g., video feeds, captured recordings, or data from a camera) of at least one client device 203 or at least one administrator device 204. The collected content 234 can include, store, or maintain compressed data of video recordings, which can be decompressed when retrieved. The collected content 234 can store the video recordings automatically, for example, when the user enables the camera on a client device 203. In some cases, the collected content 234 can restrict access to one or more files by one or more computing devices, such as the administrator device 204. For example, the collected content 234 can store video feeds uploaded from the client device 203 (e.g., uploaded automatically with permission from the user of the client device 203) when the camera is enabled. However, if the client device 203 disabled video sharing features, the collected content 234 can prevent other devices within the system 200 from accessing the uploaded video feeds from the client device 203. In this case, other devices can include the administrator device 204 using the application or other devices of one or more clients.

The data repository 232 can include a content frame 236 data structure. The content frames 236 can be referred to as video frame storage or images sequence database. The content frames 236 can include, store, or maintain frames selected or extracted by the frame selector 212. The frames can be video frames selected from the video feeds or content retrieved from the collected content 234 data structure. The frames selected by the frame selector 212 can be pre-processed or analyzed prior to selecting, extracting, or storing the remaining portions of the video. For example, the data processing system 201 can access the collected content 234 data structure to retrieve a video stream of a user (e.g., participant of a session within an application hosted by an educator of the administrator device 204) of the client device 203 (or in some cases, the administrator device 204). The data processing system 201 can identify one or more frames of interest from the video stream, such as frames that capture gestures, movements, or expressions of the user. Once identified, the data processing system 201 can extract the frames from the video to store in the content frames 236 data structure. The content frames 236 can store frames of the video for analysis by the data processing system 201 to determine at least a pose, gesture, expression, or emotion of the user. The content frames 236 can include one or more labels for each stored frame, such as timestamps based on which video the data processing system 201 extracted the frame from and the time within the video. The frames stored in the content frames 236 data structure can be retrieved by one or more components of the data processing system 201 to extract one or more features from the frame.

The data repository 232 can include features 238 data structure. The features 238 can include, store, maintain, or update features extracted from one or more frames from the content frames 236 data structure. The features can be extracted from the one or more frames by the feature extractor 216 using a machine learning model trained by the machine learning engine 220. The features can include emotion, expression, body gesture, movement characteristics, posture, gaze, or other poses exhibited by the user. The features can refer to any areas or points identified from the frame, such as the body, hands, arms, shoulder, face, head position, among others to identify the gesture, pose, or emotion of the user. The features can include various points designated to the face of the user for each frame. The points can be provided within an array, where the points are in identified positions within the array. For example, various points within the array of points can indicate the facial features of the user. In some cases, the features can store information associated with the anatomy of the user without the environmental information, such as the background features. For example, the data processing system 201 can extract features from a frame (e.g., retrieve from the content frames 236 data structure). For each frame, the data processing system 201 can identify positions of each body part and positions of the face of the user. The positions of each body part and the positions of the face can be represented by various nodal points, such as points for pose recognition or facial recognition. Each frame can include, for example, 1000 to 1500 points indicating poses of the user. The features stored in the features 238 data structure can be retrieved by one or more components of the data processing system 201. The features from each frame can be analyzed independently to determine the expression or posture of the user. With multiple frames and features extracted from the frames, the data processing system 201 can compare features between different frames, determine delta differences between the points, and detect gestures or changes of emotion exhibited by the user.

The data repository 232 can include a model 240 data structure. The model 240 data structure can include, store, maintain, or update one or more models generated or trained by the machine learning engine 220. The model 240 data structure can be accessed by one or more components within the data processing system 201, such as the feature extractor 216, the machine learning engine 220, among others. The model can be used to extract features from frames or images of a video. The model can be trained or updated by the machine learning engine 220 using pre-categorized images with different poses, emotions, or gestures of individuals. One or more models stored in the model 240 data structure can be discarded, for example, if the model is outdated or trained using inaccurate labels. Further, one or more models can be removed or replaced if an administrator of the data processing system 201 determined that a model should not be used or if there are higher performing models. For example, the data processing system 201 can process various frames to determine gestures or expressions of one or more users using a first model and a second model. The first model can output a high score for a first expression and a low score for the second expression of a user. The second model can output the opposite, a low score for the first expression and a high score for a second expression. The score can represent the likelihood of the user expressing the pre-determined pose. Based on the results of the first model and the second model, if the expected pre-determined pose is the first expression, the data processing system 201 can remove the second model from the model 240 data structure. If the expected pre-determined pose is the second expression, the data processing system can remove the first model from the model 240 data structure. In some cases, the data processing system 201 can retrain the models to increase the accuracy of determining the expressions or gestures exhibited by one or more users.

The data repository 232 can include a state 242 data structure. The state 242 data structure can include, store, maintain, or update one or more pre-determined states of the user. The state 242 data structure can include one or more images or icons resembling or representing each pre-determined state. These images or icons can be referred to as one or more states associated with one or more users of the client device 203. The images or icons can be updated with different variations or graphics to express the pre-determined states. The state can include one or more emotions or characteristics expressed by one or more users, such as surprise, happiness, confusion, nodding, waving, hand raised, head shake, shrug, daze, fatigued, wearied, among others. The state can be based on one or more features extracted from the features 238 data structure and analyzed by the machine learning model. For example, the data processing system 201 can classify, based on the identified poses of a user, the video feed of a user as showing at least one of the pre-determined states. Based on the classified state, the data processing system 201 can transmit the state for display in an application used by at least the client device 203 or the administrator device 204 to provide indications of nonverbal communication to an educator of the administrator device 204. In some cases, the state 242 data structure can store additional states provided by the data processing system 201. The states of the state 242 data structure can be retrieved by the data processing system 201, such as by the state manager 224. The state can be displayed on a display device of the administrator device 204 (or the client device 203). In some cases, the state of a user of the client device 203 can be displayed in an application accessible by the administrator device 204 or other devices without streaming video from the camera of the client device 203.

The data repository 232 can include a policy 244 data structure. The policy 244 data structure can include, store, or maintain one or more policies, rules, or criteria when accessing or using an application configured with nonverbal communication data processing. The policy 244 data structure can include one or more criteria (e.g., requirements) for the configurations of the client device 203 to access a session of the application hosted by the administrator device 204. The policy 244 data structure can be updated by one or more computing devices of the system 200, such as the administrator device 204 or the client device 203, in some cases. For example, the administrator device 204 can configure the policies of an application session to have one or more client devices 203 to enable the camera of the client devices 203 prior to accessing the session. Further, the policies can include enabling facial analysis (e.g., emotion or gesture detection) for nonverbal communication as feedback (e.g., icon or image representation of user expression) to at least the user interface of the administrator device 204. The policies can enable the feedback to be presented to other computing devices within the session, such as other client devices 203. The policies may not require the user to stream camera footage to the session, such as to maintain the privacy of the user of the client device 203. In some cases, policies can include one or more configurations or settings of the client device 203 when accessing the application. For example, the client device 203 can transmit a configuration to adjust the settings of the application to not share the video stream of the user. The client device 203 can adjust the settings of the application running on the client device 203 to retrieve video streams for feature extraction, analyze emotion or gesture of the user, or classify the state of the video stream (e.g., expressions or gestures made by the user). The policies can include other settings of the applications configured by at least one or more client devices 203 or the administrator device 204. The policies can be applied to an individual device or for all devices, such as configurations for a session hosted by an educator.

The data processing system 201 can include an interface 208. The interface 208 can be in electrical communication with one or more components of the data processing system 201. The interface 208 can include hardware, software, or a combination of hardware and software components to interface with the network 202, devices within the system 200 (e.g., client device 203 or administrator device 204), or components of the data processing system 201. The interface 208 can include features and functionalities similar to the network interface 118 to interface with the aforementioned components. For example, the interface 208 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 208 can include at least a built-in network adapter, network interface card, PCMCIA network card, EXPRESSCARD network card, card bus network adapter, wireless network adapter, USB network adapter, modem or any other device suitable for interfacing one or more devices within the system 200 to any type of network capable of communication. The interface 208 can transmit or receive information from one or more aforementioned components to extract or analyze nonverbal communication data received from one or more client devices 203.

The interface 208 can receive video feeds from the client device 203 and the administrator device 204. The interface 208 can transmit the video feeds for storage in the data repository 232 (e.g., store in the collected content 234 data structure). The interface 208 can receive video feeds as frames at various rates, such as 20 frames per second ("fps"), 40 fps, 60 fps, etc. The interface 208 can retrieve information from the data repository 232 for one or more components of the data processing system 201 or other devices within the system 200. The interface 208 can be connected to one or more sessions of one or more applications. The interface 208 can transmit a state of the user within a video stream for display within a session of an application.

The data processing system 201 can include a frame selector 212. The frame selector 212 can be in electrical communication with other components of the data processing system 201. The frame selector 212 can select or extract one or more frames from a video stream. For example, the frame selector 212 can retrieve one or more video streams of a user from a local camera of a device (e.g., a client device 203 or the administrator device 204). The device can execute a browser level Hyper Text Markup Language 5 ("HTML5") Application Programming Interface ("API"), among other languages for accessing a conference call via an in-browser application or locally installed application. The device can be accessing a video conference or video streaming session using an application installed locally or an in-browser application. The frame selector 212 can retrieve a video file stored in the collected content 234 data structure. The frame selector 212 can determine one or more individual frames from the camera feed or from the video file stored in the data repository 232 to extract. For example, the frame selector 212 can determine to extract frames with a presence of a user. The frame selector 212 can use at least one key frame extraction technique. The key frame extraction techniques can include at least shot boundary, visual information, movement analysis, or cluster technique. The frame selector 212 can use at least one of the key frame extraction techniques to identify visual information or movement information of the user and extract one or more frames with the identified information.

The frame selector 212 can identify the presence of the user based on one or more outlines identified within a frame of the video stream. Based on the identified outline, the frame selector 212 can extract the frame for feature extraction by the feature extractor 216. In some cases, the frame selector 212 can use a machine learning model to identify one or more frames with a portion of the user (e.g., features indicating that the user is present, such as the hand, face, or other portions of the user in a frame). The frame selector 212 can identify one or more points within the camera feed that resembles an individual, such as an arm, a body, a face, or at least one of the combinations. Once identified, the frame selector 212 can select or extract the frame for processing.

In some cases, the frame selector 212 can extract all frames from the video feed. The frame selector 212 can group one or more frames into different sets based on whether at least a portion of an individual is present, what portion of the user is present, or if the user is absent from the frame. The frame selector 212 can group the one or more frames in different categories, such as a category including frames with the user, without user, multiple users, with animals, among others. Each set of grouped frames can be stored in the content frames 236 data structure. For example, the frame selector 212 can use a key frame extraction technique to identify a body part of the user. The frame selector 212 can use the key frame extraction technique to identify multiple users or an animal with the user (e.g., visual information or movement information indicating one or more users or one or more pets). Based on the information provided, the frame selector 212 can group one or more frames according to a respective category based on visual information or movement information presented in the video feed.

In some cases, the data processing system 201 can downsample the video stream at a predetermined rate. For example, the client device 203 can stream a video at 60 fps. If the predetermined rate is 30 fps, the data processing system 201 can discard every other frame received from the camera of the client device 203. If the predetermined rate is 20 fps, the data processing system 201 can discard 2 out of every 3 frames received. Accordingly, the frame selector 212 can select one or more frames from the downsampled video stream and store the downsampled selections to the content frames 236 data structure. The frame selector 212 can annotate the frames indicating the downsampling rate.

The data processing system 201 can include a feature extractor 216. The feature extractor 216 can be in electrical communication with other components within the data processing system 201. The feature extractor 216 can extract one or more features of a user from a frame selected by the frame selector 212. The features of the user can refer to the facial expression, the pose, the body posture, the pose, physical characteristics of the user, physical action performed by the user, face movement, among other identifiable emotions or actions of the user. The features can be represented via various points on the face or the body of an individual within a frame. For example, the feature extractor 216 can use a machine learning model for feature extraction. The machine learning model can be a Convolutional Neural Network-based model. The machine learning model can include other Neural Network-based models, such as Recurrent Neural Network, Multilayer perceptron, or Autoencoders. The feature extractor 216 can perform face detection of an individual within one or more frames. The feature extractor 216 can apply a convolutional-based mask to the face of the individual identified within a frame. The feature extractor 216 can generate the mask with various points to detect edges of an individual. In some cases, the feature extractor 216 can apply multiple masks for any individuals within the frame. The mask can include various focal points indicating at least the jawline, the distance between the eye, cheekbones, mouth shape, jawline, or other elements of a face. The mask can provide edge detection to determine an outline of the body of the user. For example, using a pooling-based CNN layer, the feature extractor 216 can predict the location of the fingers, hands, irises, face, among other body parts of the user-perceived through the camera based on the points or mask applied to the user. The feature extractor 216 can detect other body parts of the user, such as arms, shoulders, elbows, among others.

The feature extractor 216 can output an array of points. The array of points can include at least pixel positions of important points (e.g., irises, cheeks, eyebrows, lips, etc.). In some cases, the feature extractor 216 can output four heads of the array of points, such as the face, iris, (e.g., gaze detection), body pose, and hand gesture. In some cases, the feature extractor 216 can output a linked list or one or more tree data structures, with the four heads as the parent node. The feature extractor 216 can process these features of the user using one or more machine learning models (e.g., one or more trained Neural Network based on different body parts of an individual). Further, by performing the feature extraction prior to expression analysis, the feature extractor 216 can reduce the amount of analysis required when determining the emotion or action the user exhibits.

In further example, the feature extractor 216 can retrieve one or more frames from the content frames 236 data structure. The feature extractor 216 can determine whether a user is present within the frame (e.g., if the frame selector 212 selects frames without the presence of a user). The absence of the user from the video stream can be represented as a feature of the video stream. If the user is not in the frame, the feature extractor 216 can transmit an indication of an absence of the user in the video stream to the state manager 224. The feature extractor 216 can transmit the features extracted from each frame to the state manager 224 to determine the emotion or action of the user (e.g., participants of a video conference session). The user can include users of the one or more client devices 203 or the educator of the administrator device 204. In some cases, the data processing system 201 may not extract the frames or features of a video stream from a camera of the administrator device 204.

The feature extractor 216 can determine features from multiple frames (e.g., with or without a user in the stream). The feature extractor 216 can aggregate the features from each frame to determine an aggregated feature for transmission to the state manager 224 to determine the emotion or action of the user based on the features. For example, the feature extractor 216 can extract features from a predetermined number of frames for aggregation. The predetermined number of frames can be configured dynamically based on the frame rate received from the client device 203. For example, the data processing system 201 can adjust the predetermined number of frames to be 20%, 50%, or 100% of the frames received per second. In this example, if the camera of the client device 203 records at 30 fps (e.g., transmitted to the data processing system 201 at the same rate), the data processing system 201 can retrieve 6 frames, 15 frames, or 30 frames at a time for feature extraction. Once the features are extracted, the feature extractor 216 can group the features of the frames and transmit them to the state manager 224.

In some cases, the feature extractor 216 can transmit one or more extracted features to the state manager 224 at a predetermined period of time (e.g., predetermined cycle or timeframe). For example, the feature extractor 216 can extract the features from one or more frames. The feature extractor 216 can refer to a policy within the policy 244 data structure to identify a timeframe for transmission to the state manager 224. The predetermined period of time can be set by the administrator device 204 within the setting of an application (e.g., refresh rate for updating the state of the user). Accordingly, the feature extractor 216 can transmit the extracted features to the state manager 224 responsive to triggering the predetermined timeframe set by the administrator device 204, for example.

In some cases, the feature extractor 216 can identify changes in the pose of the user. The changes in the pose can be referred to as an action or a movement of the user. The action can include at least one of waving, raising a hand, tilting, nodding, scratching, among other gestures. The feature extractor 216 can determine a delta between subsequent frames. For example, the feature extractor 216 can apply the first mask identifying points outlining the user of a first frame. For a second frame, the feature extractor 216 can apply a second mask to the image of the user. The feature extractor 216 can compare the first mask (e.g., the first set of points) to the second mask (e.g., the second set of points) representing the user. The feature extractor 216 can determine a delta (e.g., change of position) between the first set of points and the second set of points. The feature extractor

216 can provide the delta for the state manager 224 to determine an action by the user. The feature extractor 216 can repeat this process between other subsequent frames. The feature extractor 216 can store one or more extracted features or the delta in the features 238 data structure.

The data processing system 201 can include a machine learning engine 220. The machine learning engine 220 can be in electrical communication with other components of the data processing system 201. The machine learning engine 220 can generate or update a machine learning model using one or more machine learning techniques or algorithms. The machine learning techniques can include at least a linear regression, logistic regression, decision tree, support vector machine ("SVM"), Naïve Bayes Classifier, k-nearest neighbors, k-means, dimensionality reduction, gradient boosting, or other types of learning techniques. The machine learning model can utilize other data processing techniques, such as an image processing technique (e.g., image restoration, linear filtering, pixelation, etc.). Other methods or techniques used to train or update a machine learning model can be utilized by the machine learning engine 220. The machine learning engine 220 can receive one or more images (e.g., frames of one or more video streams) for generating, training, or updating a model. The machine learning engine 220 can store a generated model in the model 240 data structure. The machine learning engine 220 can retrieve a model from the model 240 data structure for updating or using the model. The machine learning engine 220 can generate new models or retrieve existing models for use by one or more components of the data processing system 201, such as the frame selector 212, the feature extractor 216, or the state manager 224. The machine learning engine 220 can replace a model stored in the model 240 data structure, such as replacing an outdated model with a newly trained model.

The machine learning engine 220 can train multiple models for different sets of features provided by the feature extractor 216. For example, the machine learning engine 220 can train independent models to identify poses of the face, the iris, the body, or the hand gesture of the user. The machine learning engine 220 can train the models using image files together with expected results (e.g., expected pose, action, emotion, expression, or gesture of the user for the model to predict). For example, the machine learning engine 220 can identify the positions of different parts of the user and associate the positions with the expected results. The machine learning engine 220 can reiterate the process for a predetermined number of training images, such as 100, 1,000, or 10,000 images. The machine learning engine 220 can train the model with, for example, 1,000 samples (e.g., images or frames) to label or detect a state of the video stream. In some cases, using a trained model, the data processing system 201 can determine novel classifications of video stream state, such as confusion or surprise expressions.

In another example, the machine learning engine 220 can train a model using masks or outlines identified in one or more frames. For example, the machine learning engine 220 can be trained with pre-processed images, filtering the colors, background captured in an image, or other details that may not represent a pose of a user. The pre-processed images can be similar to images with extracted features (e.g., features from the features 238 data structure). In other words, the machine learning engine 220 can train one or more models based on the features identified in the images. The machine learning model can be used on the features to determine one or more states or transition between states the user expressed via the video stream. The emotion or action expressed by the user can be generally referred to as a state of the video stream. By training the model based on detected edges in the images and using the model for detecting emotion and action of the user based on the nodal points, the data processing system 201 can reduce resource consumption and enable classification of user emotion or gesture in real-time or with low latency, such as within 10 ms, 100 ms, 0.5 seconds, or 1 second from receiving a video stream from the client device 203.

The machine learning engine 220 can train a model using a neutral pose or position (e.g., normal pose or standard pose) of one or more individuals. Similarly the machine learning engine 220 can train the model using a neutral expression of one or more individuals. The machine learning engine 220 can compare these neutral poses or expressions (e.g., represented by a mask or points) to different poses of the respective one or more individuals. The neutral pose or expression can refer to, for example, the expression of an individual when facial muscles are relaxed or the pose of the individual while standing or sitting with other portions of the body in a relaxed position (e.g., arms and shoulder down, face forward, etc.). The machine learning engine 220 can compare the neutral pose with other poses to determine one or more delta values or changes in the points/structure of the mask of the respective individual. The machine learning engine 220 can repeat the training for different individuals to learn the physical attributes, movements, or characteristics involved when changing expression. Further, the machine learning model can use different combinations of deltas at various parts of an individual to analyze nonverbal communication data.

For example, the machine learning model can identify eyebrows raised (e.g., positive delta to left/right/middle of the eyebrows with respect to the neutral expression) and a smile (e.g., corner of mouth indicates positive delta) by an individual. In this case, a positive delta can include upward motion and a negative delta can indicate downward motion of the respective body part from the neural pose or expression. The distance of changes can be different depending on the individual. Using the machine learning model, the data processing system 201 (e.g., the state manager 224) can label the state of the user as "happy surprise". In another example, if the machine learning model identifies that the individual is frowning while making a gesture (e.g., head scratch or touching their chin), the data processing system 201 can predict that the user is confused and label the state accordingly. Hence, the machine learning model can be used to determine the expression and action by one or more users of one or more client devices 203. Accordingly, by using the aforementioned training techniques and nonverbal communication analysis, the data processing system 201 can avoid an excessive amount of training data (e.g., since the machine learning engine 220 can train the model using masks or features extracted from the frame), avoid overfitting of existing labels (e.g., various images that indicate emotion or state of a user), avoid inability of handling video scaling and perspective correction (e.g., since edge detection can be used), and avoid the low speed of inference resulting in delays when trying to keep up with incoming video feeds.

The data processing system 201 can include a state manager 224. The state manager 224 can be in electrical communication with other components of the data processing system 201. The state manager 224 can retrieve one or more features stored in the features 238 data structure. The features can be associated with one or more frames of a video stream. The state manager 224 can classify the state of the user in the video stream from a pose identified based on the extracted features. The state of the user can be at least one of various states stored in the state 242 data structure. The state can represent the emotion or action of the user either at the frame being analyzed or during a group of frames analyzed by the components of the data processing system 201. The state manager 224 can use a machine learning model to determine the state. For example, the state manager 224 can retrieve features of a frame responsive to the feature extractor 216 extracting the features from the frame. The state manager 224 can determine one or more types of features present in the frame, such as the face, hand, body, or eye of the user.

The state manager 224 can determine the emotion of the user based on the features of the face, the eye, or other types of features, either alone or in combination. For example, the state manager 224 can use the machine learning model to determine the expression of the user in a frame. If the mouth of the user indicates a smile while the eyes gaze at the screen, the state manager 224 can classify the state of the video stream at the frame as "happy" or "comprehended," for example, when the user comprehended details within a lecture. In another example, the facial expressions are neutral, the state manager 224 can classify the state as "neutral." The state manager 224 can transmit the classified state to the notification manager 228 to provide a notification of the emotion or action of the user. In some cases, based on the classified state (e.g., the neural state), the state manager 224 may not transmit the state to the notification manager 228 or the notification manager 228 may not notify the administrator device 204 via an application session. Other classifiable states can include distracted (e.g., indicated by prolonged gaze away from the screen or the camera), confusion, boredom, upset, sadness, anger, among others.

The state manager 224 can determine gestures or actions performed by the user based on features of the hand, the body, the eye, or other types of features, either alone or in combination. The state manager 224 can determine if the user performed an action based on the changes in the points identifying the shape of the body, hands, arms, head, shoulder, or other parts of the user. For example, the state manager 224 can determine a hand raise action based on one or more points associated with the fingers and hands indicating that the hand is in an open position and the palm is pointed towards the camera. In other words, based on the mask or points associated with one or more body parts, the state manager 224 can determine movement or actions performed on the video stream. In another example, the state manager 224 can determine a nodding head state (e.g., user grasping a concept in a lecture) based on a fluctuation between a positive and a negative delta of the head mask within several frames in a predetermined time, such as 1 second, 2 seconds, or 3 seconds. The positive and negative delta of the head mask (e.g., one or more points representing the head) can indicate that the head position is shifted up above or down below the neutral position. In this case, the delta can be in the y-axis. If in the x-axis, the positive and the negative delta can indicate the head moving left to right or vice versa (e.g., head rotation to say "no"). The state manager 224 can determine a hand wave state based on the body mask similar to the hand raise state, but with x-axis positive and negative delta.

The state manager 224 can process delta values between various sets of points generated by the feature extractor 216. The delta values can represent changes in the position of the points between various frames. The state manager 224 can determine the action of the user based on the delta value between frames. The state manager 224 can use the machine learning model (e.g., trained by the machine learning engine 220) to determine a shift in emotion or body pose of the user. The shift can be based on a change in the position of the nodes representing features of the user. The state manager 224 can determine the shift by comparing the expression presented in the current frame to other expressions (e.g., neutral expression) represented by a mask (e.g., various points on an image indicating the body or the face of an individual). Once a state is classified, the state manager 224 can transmit an indication of the state to the notification manager 228.

In some cases, the state manager 224 can aggregate one or more states from a predetermined number of frames. For example, the state manager 224 can determine one or more states of the user in a predetermined number of frames, such as in 10 frames, 20 frames, 30 frames, etc. The state manager 224 can determine the state of the user in each frame. The state manager 224 can identify the highest repeating state given the predetermined number of frames and transmit the identified state (or indication of the state) to the notification manager 228. The state manager 224 can identify multiple states to notify the educator via the session, such as the two highest appearing states from the predetermined number of frames. The state manager 224 can use the machine learning model to determine the likelihood of a state in a frame. The likelihood can be represented as a score. The state manager 224 can combine the score from multiple frames and rank the states of the frames by score, for example. The state manager 224 can pick one or more states with the highest score (e.g., the highest likelihood of correct emotion or expression) to transmit or indicate to the notification manager 228.

In another case, the state manager 224 can aggregate one or more states from various frames within a predetermined time. For example, based on a policy from the policy 244 data structure, the state manager 224 can classify multiple frames within a predetermined time. The predetermined time can be a refreshing time for providing the educator with the next emotion or actions expressed by the participants using one or more client devices 203. The predetermined time can include, for example, 1 second, 2 seconds, 3 seconds, 5 seconds, among others. Based on received fps, the state manager 224 can classify 10 frames to 100 frames together, for example. Once classified, the state manager 224 can score one or more classified states to determine the highest-ranking state or identify one or more states that appeared the most to provide to the notification manager 228.

In some cases, the state manager 224 can transmit the classified state of the user responsive to a shift in emotion or action of the user. The state manager 224 may not transmit the classified state if it is the same as the previous state provided to the notification manager 228. For example, the state manager 224 can classify a first state for a first frame or a first group of frames and transmit the first state to the notification manager 228. The state manager 224 can classify a second state for a second frame or a second group of frames subsequent to the first frame or the first group. The state manager 224 can determine that the second state is the same as the first state, and determine not to provide the second state to the notification manager 228. If the state manager 224 classify a third state, different from a first state or the second state, based on a third frame or a third group of frames, the state manager 224 can transmit the indication of the third state to the notification manager 228, for example, to change the icon or expression presented in the session of a video conference.

In some cases, the state manager 224 can determine that the features indicate an absence of the user (e.g., no mask or points within the frame). The state manager 224 can determine that the user is moving away from the camera based on an initial movement of the user in a first set of frames and an absence of the user in a second set of frames. The state manager 224 can classify the state as an absence or away from the keyboard accordingly. The state manager 224 can use multiple machine learning models to classify the state of the video stream based on the extracted pose, such as different machine learning models for hand gestures, body orientation, face points, or iris movement/location. For example, the state manager 224 can provide one or more points detected for each body portion to respective machine learning models (e.g., Neural Networks trained with the conditional states of hand gestures, body orientation, face points, or iris movement/location). From the results of the machine learning model, the state manager 224 can classify the state of the video frame including the emotion or action expressed by the user.

The data processing system 201 can include a notification manager 228. The notification manager 228 can be in electrical communication with other components of the data processing system 201. The notification manager 228 can receive one or more states from the state manager 224. The notification manager 228 can receive an indication of one or more states from the state manager 224. The notification manager 228 can retrieve the states from the state 242 data structure. The notification manager 228 can transmit the state for display in a session of an application accessed by at least the client device 203 or the administrator device 204. For example, the notification manager 228 can receive or retrieve a state of a video stream of a client device 203. The client device 203 can join a session with or without sharing a video stream to the session. Once accessed the session, the presence of the client device 203 in the session can be displayed as a box, an icon, or other user interfaces in the session. The notification manager 228 can provide the state of the video stream to the associated user interface of the client device 203 (e.g., in or near the presence of the client device 203 streaming the video). The notification manager 228 can share the state of the video stream as an icon, text, image, etc. Based on the policies of the session, which can be configured by the administrator device 204, for example, the notification manager 228 can notify the state of one or more users to the user interface of the administrator device 204 without notifying the client devices 203. Based on another policy of the session, the notification manager 228 can present the state of each user to any devices accessing the session, including the client device 203 and the administrator device 204.

The notification manager 228 can remove the state of each user after a predetermined time (e.g., based on the policy of the session). For example, an educator can set the icon display time to 5 seconds. Therefore, the notification manager 228 can remove a state associated with a video stream 5 seconds after notifying at least the administrator device 204. The educator can also set a state or icon refresh rate. The state refresh rate can refer to a timeframe for the state manager 224 to provide an updated state of one or more video streams associated with one or more client devices 203 in the session. For example, with 3 seconds refresh rate, the notification manager 228 can request the next state (e.g., the highest-scoring state of the accumulated frames analyzed by the components of the data processing system 201) from the state manager 224. Responsive to the request, the notification manager 228 can receive at least one state from the state manager 224, and provide the state to the session. In some cases, if the notification manager 228 receives a state similar to the previously shown state of the client device 203, the notification manager 228 may not notify the administrator device 204 of the state.

The notification manager 228 can update the state of each user responsive to receiving a new state from the state manager 224. For example, the notification manager 228 can compare the recently received state from the state manager 224 to a state previously provided to the session or the administrator device 204. If the two states are different, the notification manager 228 can provide the new state to the session executing on at least the administrator device 204 or the client device 203. Based on one or more policies, the state of each video stream associated with a respective client device 203 can be shown in their respective interface box for streaming the client device 203 videos. In some cases, the notification manager 228 can aggregate states of multiple client devices 203 into a single state and present the single state to the administrator device 204 via the user interface of the application.

Accordingly, the data processing system 201 can include features and functionalities to extract and analyze nonverbal communication data from video streams of the client device 203. The data processing system 201 can classify the state of the video streams and provide an indication of the state to one or more devices within a session of an application, such as the administrator device 204 or one or more client devices 203. The data processing system 201 can execute the features and functionalities via an in-browser application or locally stored application on at least the client device 203 or the administrator device 204. The data processing system 201 can perform various processes in part or entirely within a browser or a device operating system. Therefore, the features and functionalities described can be executed at client-side at low latency without requiring the users to share video streams to others accessing the same session. Further, the data processing system 201 can apply in-browser machine learning enabling the features and functionalities to be portable across various devices and platforms.

Figure 3:
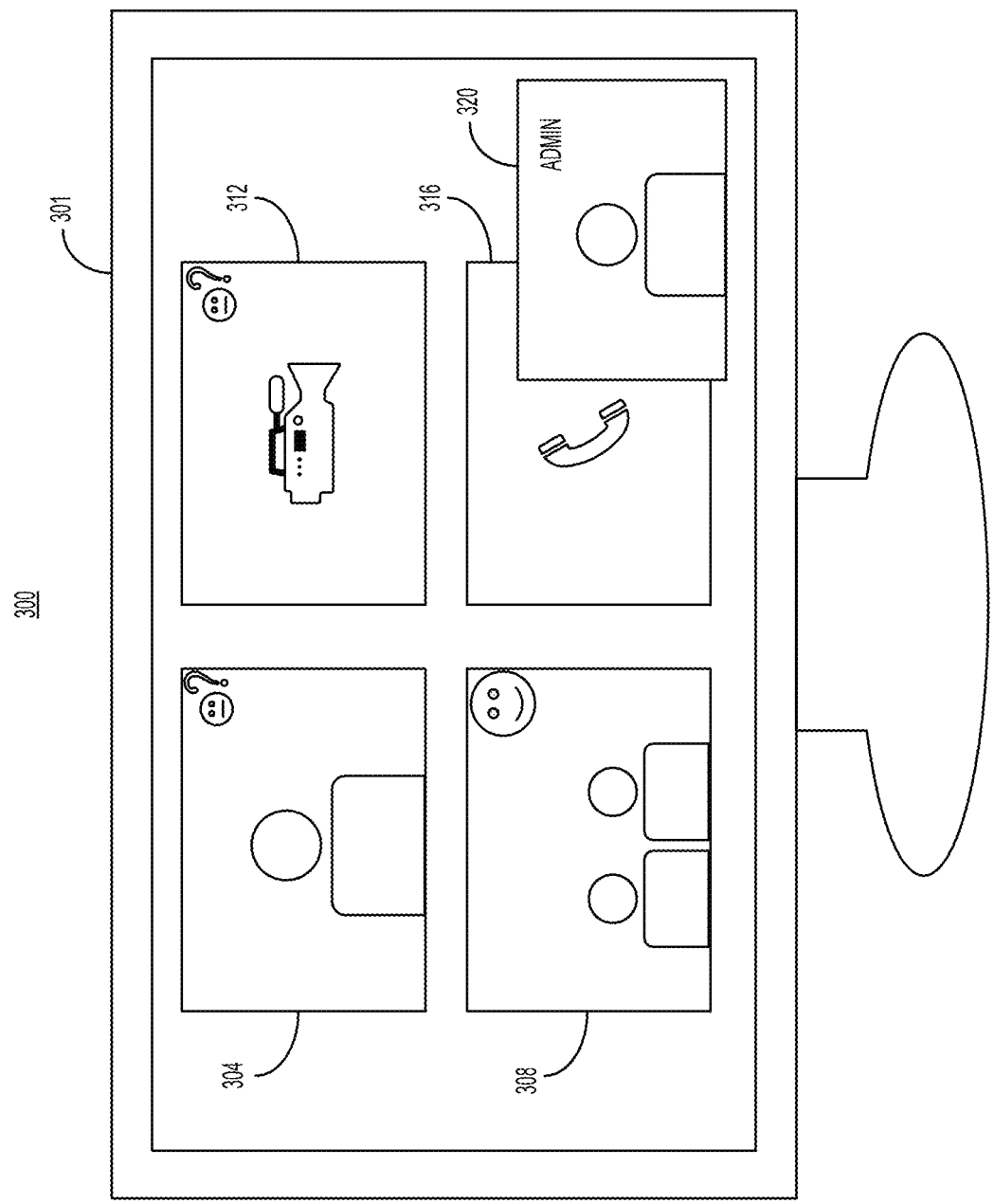
FIG. 3 is an example illustration of a display device displaying video streams with states of participants, in accordance with one or more implementations.

FIG. 3 shows an example illustration of a display device displaying video streams with states of participants, in accordance with one or more implementations. The illustration 300 can include one or more operations that can be executed, performed, or carried out by one or more components of the system 200, such as the data processing system 201, the network 202, the client device 203, the administrator device 204, or the computing system 100 as described in FIGS. 1A-D. The illustration 300 can include a display device 301 (e.g., monitor screen, table screen, phone screen, etc.). The display device 301 can be a display device of an administrator device (e.g., an example illustration of the monitor of the administrator device when accessing the video conference). The display device 301 can include an admin frame 320 with frames of participants including at least frames 304, 308, 312, and 316, for example. The display device 301 can display a video conference session within an application. An educator (e.g., sharing video stream via admin frame 320) can host the session which one or more participants can access. The educator can access the session using an administrator device. The one or more participants can access the session using one or more client devices.

The participants can enable video stream sharing or disable video stream sharing in the session. The participants can be referred to as a first user using a first device at frame 304, a second user using a second device at frame 308, a third user using a third device at frame 312, and a fourth user using a fourth device at frame 316. For example, the educator, the first user, and the second user can enable video streams, such as shown in frames 304, 308, and 320. The first user and the second user can enable emotion or action analysis. During the video stream, the data processing system can analyze and access the emotion or action expressed by the first user and the second user. The data processing system can provide the states of the users as icons. The icons can be shown in any portion inside the frames of the respective user expressing the one or more state. In some cases, the emotions or actions of all users can be accumulated into a single emotion or action (e.g., a single nonverbal communication indication or a single icon). The single icon can be shown in any portion of the user interface displayed via the display device 301, for example.

For example, frames 304, 308, and 312 can include icons on the top right of each frame. The icons can be provided by the data processing system after classifying the state of each user in their respective video stream. The icon shown in frame 304 can represent the user in a confused state (e.g., similar to the icon shown in frame 312). The icon shown in frame 308 can represent the user in a happy state. In some cases, the data processing system can exclude one or more users from state analysis and classification based on a policy, configuration, or setting of the application. The settings can be configured by the educator of the administrator device. For example, the data processing system may not perform state analysis for users with disabled camera, users that rejected the terms and agreement for using the feature extraction and analysis (e.g., among other data that may be used), a user set to be excluded from the analysis (e.g., configured by the administrator device), users that are presenting or controlling the session, or the host of the session. The data processing system can exclude a user that is presenting or using the shared-screen functions, as other users should be paying attention to this one user (e.g., a group of users in a video stream).

The data processing system can determine a state for multiple users within a single video stream. For example, as shown in frame 308, multiple participants can appear in a video stream. The data processing system can determine that there are multiple users and classify the state of the users individually. In some cases, the data processing system can provide a state for each of the users configured to be displayed individually in a frame (e.g., two icons for two users, three icons for three users, etc.). In this case, the icons can appear in any position with the frame adjacent to their associated users. In some cases, after classifying the states of the users, the data processing system can determine the score (e.g., likelihood) of each user state. For example, the data processing system can aggregate the scores from the users to identify the highest scored state for selection. The data processing system can select the state having the highest score and provide the state for display as a single icon in frame 308, for example. In another example, the data processing system can determine the total number of each predetermined state classified for the users. Based on the total number of each state, the data processing system can provide the state with the highest count to the session for display in the frame.

The data processing system can display an icon representing the state of one or more users in a video stream without providing or sharing the video stream to the session. If the session is managed by a remote computing device, the data processing system can provide the icon without providing the video stream to the remote computing device. For example, frame 312 can include an image (e.g., a video recorder, an image set by the third user, among others) indicating that the video stream is not available from the third device. Without sharing the stream, the data processing system can provide a state of the third user in frame 312. The data processing system can classify the state of the user in-browser executing on the third device or on the device operating system. In this example, the camera of the device can be active, but the user can disable video stream sharing. In some cases, the session can disable video stream sharing from participants, while enabling state classification to maintain users' privacy.

In some cases, a user can access the session using a device with the camera disabled or a device without a camera. The display frame associated with the user may not include a state icon, such as in frame 316. In the case of frame 316, the user can access the session using a mobile device with a disabled camera. Based on the configuration settings of the application, the session may not be accessible for users without camera enabled or feature analysis enabled. The camera can be enabled only for the data processing system to perform feature analysis and emotion/action detection. Similarly, the data processing may not provide a state icon for one or more devices with feature analysis disabled, or if the application disabled feature analysis for one or more users based on an application setting. For example, based on the policy, the data processing system can disregard processing the video stream from the administrator device. Accordingly, frame 320 showing the video stream with the educator may not include a state icon.

Figure 4:
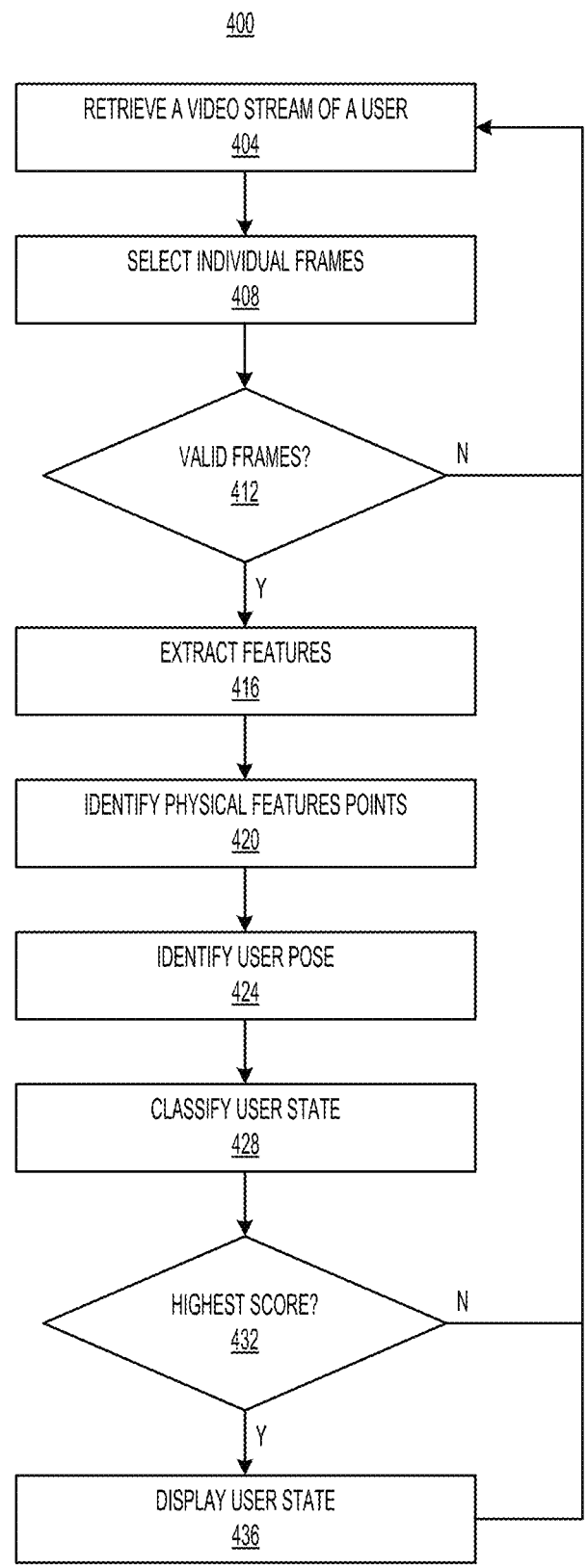
FIG. 4 illustrates an example flow diagram of a method for extraction of nonverbal communication data from video, in accordance with one or more implementations.

FIG. 4 illustrates an example flow diagram of a method for extraction of nonverbal communication data from video, in accordance with one or more implementations. The method 400 can be executed, performed, or otherwise carried out by one or more components of the system 200 (e.g., data processing system 201, network 202, client device 203, or administrator device 204), the computer system 100 described herein in conjunction with FIGS. 1A-1D, or any other computing devices described herein. In a brief overview of method 400, the data processing system (e.g., the data processing system 201, etc.) can retrieve a video stream of a user at step 404. At step 408, the data processing system can select various individual frames of the video stream. At step 412, the data processing system can determine if the one or more frames are valid. At step 416, the data processing system can extract one or more features from each frame. At step 420, the data processing system can identify points associated with the physical features of the user. At step 424, the data processing system can identify a pose of the user. At step 428, the data processing system can classify the video stream as showing one of the various predetermined states. At step 432, the data processing system can determine at least one of the one or more classified states with the highest score. At step 436, the data processing system can display the state of the user. The method 400 can be looped or performed, for example, at least until the user exits a video sharing session of an application, until the camera is disabled, or until the host of the session (e.g., using an administrator device) disables feature detection or analysis.

Still referring to FIG. 4 in further detail, at step 404, the data processing system can retrieve a video stream captured by a camera of a device of the user. The data processing system can retrieve the video stream of the user directly from the camera of the device, such as prior to sharing the video stream for display in an application. In other words, the data processing system can retrieve the video stream before or without the video stream provided to a remote computing device configured to display the video stream on the application. The data processing system can receive a video stream from a camera connected to a remote computing device, such as computing devices of other participants in a video conference. The data processing system can execute one or more operations in-browser or independently on an operating system of a device. In some cases, the data processing system may not retrieve a video stream from a host device or administrator device. The data processing system can retrieve the video stream from the administrator device based on the application setting configurable by the host or administrator of a video conference session, for example.

The data processing system can downsample the received video stream. For example, the data processing system can be configured to receive 20 fps. If the camera is recording and transmitting data higher than 20 fps, the data processing system can discard one or more incoming frames to capture the predetermined number of frames to receive. In other cases, the data processing system can receive all the frames captured by the camera. The data processing system can reduce the number of frames for analysis via frame selection at step 408. Responsive to receiving the video stream, the data processing system can proceed to step 408 to select one or more frames from the video stream.

At step 408, the data processing system can select various individual frames of the video stream. The data processing system can select one or more frames based on a predetermined threshold of frames for features analysis. For example, if the frame threshold is 20 fps and 60 frames are received per second (e.g., a threshold is lower than the received frames), the data processing system can select one frame out of three to satisfy the 20 fps threshold. In another example, if 60 fps is the threshold and 30 frames are received per second (e.g., a threshold is higher than the received frames), the data processing system can process the 30 frames without removing a frame. In some cases, the data processing system can perform upsampling on the received frames.

The data processing system can select one or more frames with the user present. For example, the data processing system can identify an outline of the user appearing in the video stream. The data processing system can select the frame with the identified outline of the user for feature extraction. In some cases, the data processing system can select one or more frames without the user present. For example, the data processing system can determine that a frame does not have any outlines or indications of the user in the video stream. In this example, the data processing system can select the frame to provide a state of absence or away-from-keyboard for displaying to at least the administrator device or other client devices. In some cases, not displaying the state of the user can indicate the absence of the user. Once the frames are selected, the data processing system can proceed to step 412 to determine if one or more frames are valid.

At step 412, the data processing system can determine if one or more frames are valid. The frames can be considered valid or invalid based on one or more policies for feature extraction. For example, the data processing system can determine that the frame is valid if at least a part of the user appeared in the frame. The data processing system can determine that the frame is invalid if no part of the user is captured in the frame. In some cases, the data processing system can determine that the frame is invalid based on a lack of one or more body parts of the user. For example, the data processing system can identify frames without the hands or head of the user captured. In this case, the data processing system can determine that the frame is invalid. The data processing system can discard invalid frames while maintaining the valid frames for feature extraction. The data processing system can remove frames that are not valid and proceed back to step 404 to receive additional frames. The data processing system can proceed to step 416 if the frames are valid. In some cases, the data processing system can proceed to step 416 by removing the invalid frames. Depending on the remaining valid frames, the data processing system can revert to step 404 (e.g., the total number of frames does not satisfy a threshold, such as 20 frames) or proceed to step 416 (e.g., the total number of frames satisfy a threshold number).

At step 416, the data processing system can extract one or more features from each of the selected frames. The data processing system can use a machine learning model to extract the features. For example, the data processing system can apply edge detection to determine an outline of the user. The data processing system can detect, using edge detection, an outline of the hands, face, body, arms, among other physical parts of the user. The data processing system can use other detection techniques to outline or determine different physical parts of the user captured in the frame. The data processing system can extract the detected physical parts of the user. The data processing system can extract each type of physical part independently. The data processing system can group each type of physical part for processing by different machine learning models trained for certain physical part types or processing by convolutional neural networks.

The data processing system can perform dimensional reduction to each frame prior to or after extracting the features. For example, the data processing system can remove shadows, colors, background, or other details of or around the users not relevant to determine the emotion or action of the user. The dimensional reduction can be a form of image filtering. The data processing system can reduce resource consumption or one or more points corresponding to the physical features of the user using dimensional reduction. After extracting the outline, determining different parts of the user, or reducing the dimension of the frames, the data processing system can proceed to step 420.

At step 420, the data processing system can identify various points corresponding to the physical features of the user. For example, the data processing system can identify or apply a mask or one or more points (e.g., nodal points or focal points) to one or more physical features of the user, such as the body, the hand, the face, or the irises of the user. The mask can include between 1000 and 1500 points to determine the physical features of the user, among other numbers of points. The number of points can be applied at predetermined spots based on the type of physical part of an individual. For example, on the hand, the data processing system can apply one or more points for individual joints on the hand, edges around the hand including the tip of the fingers, among other adjustable points on the hand. In another example, on a face, the data processing system can apply one or more points for one or more bones of the face, such as jawbones or cheekbones, the eyebrows, the irises, the forehead, the lips, the nose, among other physical features of the user. The data processing system can use the mask as the extracted feature for each of the selected frames.

The data processing system can provide multiple arrays including identified positions of points corresponding to different physical features of the user. The different physical features can refer to different body parts of the user. The data processing system can provide independent arrays for the hand, arm, body, or face of the user. The data processing system can provide the arrays for each of the frames to a corresponding neural network. For example, an array for the hand can include identified positions of points for the joints, fingers, tip of the fingers, knuckles, among other features of the hand. In another example, an array for the face can include the iris position, ears, nose, mouth, among other features presented on the face. The data processing system can proceed to step 424 after identifying the points.

At step 424, the data processing system can identify a pose of the user from the one or more extracted features of the user. The pose can refer to a position or displacement (e.g., delta or changes in position) of the physical features which can be used to determine an action performed or emotion expressed by the user. The data processing system can use a machine learning model to determine a pose of the physical features based on the points corresponding to the physical features. The data processing system can use one or more machine learning models based on the type of physical features. For example, the data processing system can use a first machine learning model for the features of the face, a second machine learning model for the features of the iris (e.g., gaze detection), a third machine learning model for the features of the body pose, or a fourth machine learning model for a hand gesture.

The data processing system can determine a neutral position of the various points (e.g., neutral points) indicating a neutral face, body pose, hand position, or iris position of the user. The neutral position can refer to a neutral pose when individuals are in a relaxed state. The data processing system can compare extracted features of selected frames to the neutral points to determine one or more actions or emotions of the user. The data processing system can determine an x-axis or y-axis displacement for different points. For example, the data processing system can determine a raised hand if the position of the hand on the y-axis is similar or higher than the y-axis position of the head, all fingers are stretched apart, and the position is maintained for a predetermined threshold of subsequent time, such as 1 second, 2 seconds, or 3 seconds (e.g., depending on the frame rate, this can refer to 30 frames, 60 frames, or 120 frames to determine that the action is a hand raise). In this example, the y-axis position of the hand can be, measuring from the center of the palm, 5 inches below to 12 inches higher than the y-axis position of the head.

In further example, the data processing system can determine a waving gesture based on the displacement of hand points from the neutral hand position (e.g., x-axis position similar to the elbow x-axis position). The data processing system can determine that the x-axis displacement of the hand fluctuates between negative and positive delta every set of frames (e.g., every 10 or 20 frames) for a predetermined number of frames, such as 60 frames or 120 frames. Accordingly, the data processing system can determine that the user is waving. After identifying the user pose, the data processing system can proceed to step 428.

At step 428, the data processing system can classify the video stream as showing one of the various predetermined states. The predetermined state can include at least surprise, anger, confusion, happiness, boredom, unattentive, among others. The predetermined states can include actions by the user, such as hand raise, hand wave, nodding, among others. The data processing system can use a machine learning engine (e.g., or a neural network) to determine the state from the identified poses of the user for the frames of the video stream. The data processing system can determine the state of the user based on the deltas of the points (e.g., displacement of the points). A positive delta can indicate a higher position of the point from their neutral position, and a negative delta can indicate a lower position of the point from their neutral position, referring to the y-axis delta. In the x-axis, positive/negative delta can indicate the orientation or left/right position shift from the neutral position.

For example, the data processing system can determine a happiness state based on the corners of the mouth having positive y-axis deltas, a boredom state based on the eyelid having negative y-axis deltas (e.g., the eyelid is near closing) or the iris having either positive or negative x-axis deltas (e.g., looking away from the camera or screen of the device), a surprise state based on the eyebrows having positive y-axis delta, among other emotions detectable based on changes in the position of the points. The data processing system can combine body pose with facial expression to determine the state, such as boredom when the points indicate frowning and a finger touching the user's chin. In cases with multiple users in the frame, the data processing system can determine a state for each user. The data processing system can provide the state for display in a video conference individually for each user. The data processing system can provide an aggregated state by combining the state of each user. The data processing system can determine the aggregated state based on the scores of the predetermined states corresponding to the users.

For each frame, the data processing system can determine a score for each of the predetermined states. For example, the data processing system can determine a likelihood for each of the predetermined states represented as a score (e.g., 1 to 10, 1 to 100, etc.). The likelihood can be based on the level of expression captured in the frame. If the user smiles slightly, the data processing system can input a low score for a happiness state. If the user heavily frowns, the data processing system can input a high score for confusion or anger based on other factors, including hand position or movement. The data processing system can identify the highest-scoring state of the various predetermined states from aggregated output values (e.g., scored value for each state). The data processing system can use a single machine learning model to score each state for the aggregated output values. The data processing system can use various machine learning models for the aggregated output values. For example, the data processing system can use one machine learning model to score a happiness state, another machine learning model to score a boredom state, an additional machine learning model to score a confusion state, etc. Therefore, the data processing system can aggregate output values from different machine learning models to determine the highest scoring state.

At step 432, the data processing system can determine, based on various scores associated with the classified states, the highest-scoring state for presentation by display devices of at least the client device or the administrator device. The data processing system can compare the score between each predetermined state to determine the highest score. The data processing system can compare the highest score to a score threshold (e.g., likelihood of the predicted emotion or action). For example, the score threshold can be predetermined at 70/100. The score threshold can be configured based on an operator of the data processing system. If the data processing system determines that the highest-scoring state is less than the threshold, the data processing system can revert back to step 404 to receive a new group of frames to re-evaluate the state of the user. If one or more scores satisfy the threshold, the data processing system can proceed to step 436 with at least one of the states, such as the highest-scoring state or the two highest-scoring states, for example. The data processing system can proceed to step 436 with the highest-scoring state. In some cases, the highest-scoring state can refer to a predetermined state that appeared the most in a group of frames.

At step 436, the data processing system can provide the user state for displaying to one or more devices in a video session. If the application is managed by a remote device, the data processing system can transmit an indication of the state to the remote device for display in a session accessed by the client device of the user. The video session can refer to a video conference call, a stream, other in-browser applications, or other locally installed applications on the client device or the administrator device. The data processing system can provide the state of the user to a session of an application. The state of the user can appear within an interface frame where (if sharing video stream) the video stream of the user can appear in the session. The location or appearance of the icon representing the states can be configured via the settings of the application. The data processing system can display the user state with a video stream of the user. The data processing system can display the user state without displaying the video stream.

In some cases, the data processing system can provide the state responsive to a time interval. The time interval can refer to a refresh rate of the state, configurable by the administrator device, for example. The data processing system can provide the state responsive to classifying the state of the user. The data processing system can provide a new state responsive to a change of the user state. In some cases, the data processing system may not provide the state if the current classified state is the same as the previously provided state. The displayed state can be removed responsive to a timer. For example, the timer can be set to 3 seconds, 5 seconds, or 10 seconds, depending on application settings. Responsive to the timer, the remote computing device can hide or remove the state from being displayed. Accordingly, the data processing system can process and analyze nonverbal communication data from video streams.

The data processing system can loop back to step 404 after providing the state. The loop can be terminated based on one or more events or lack of events. For example, the data processing system can terminate the operations of method 400 responsive to disabling a camera of the client device (or the administrator device). The data processing system can terminate the operations when there are no new frames to retrieve for processing. The data processing system can terminate the operations after the session is terminated or the client device (or the administrator device) disconnects from the session. The data processing system can terminate the operations if the administrator device disabled the feature analysis function in the application.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the educational content system 205 can include clients and servers. For example, the educational content system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the educational content system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for generating and formatting multiple teaching media, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method for extraction of nonverbal communication data from video, comprising:
   retrieving, by a processor of a computing device from a camera of the computing device, a video stream of a user;
   selecting, by the processor, a plurality of individual frames of the video stream;
   for each of the plurality of individual frames of the video stream:
      extracting, by the processor, a plurality of features,
      identifying, from the extracted plurality of features for a frame of the plurality of individual frames, a plurality of points corresponding to physical features of the user at identified positions within the frame, and
      identifying, by the processor from the extracted plurality of features, a pose of the user; and
   classifying, by the processor via a neural network from the identified poses of the user for the plurality of individual frames of the video stream, the video stream as showing one of a predetermined plurality of states by providing an array comprising identified positions of points corresponding to a physical feature of the user for each of the plurality of individual frames to the neural network, and identifying a highest scoring state of the plurality of states from output values of the neural network.

2. The method of claim 1, wherein retrieving the video stream of the user further comprises retrieving the video stream from one of a camera connected to the computing device and a camera connected to a remote computing device.

3. The method of claim 1, wherein selecting the plurality of individual frames of the video stream further comprises downsampling the video stream at a predetermined rate, and selecting the plurality of individual frames from consecutive frames of the downsampled video stream.

4. The method of claim 1, wherein extracting the plurality of features further comprises processing each frame of the plurality of individual frames with a convolutional neural network.

5. The method of claim 1, wherein extracting the plurality of features further comprises performing an edge detection and dimensional reduction on each frame of the plurality of individual frames.

6. The method of claim 1, wherein classifying the video stream as showing one of the predetermined plurality of states further comprises:
   providing a plurality of arrays comprising identified positions of points corresponding to different physical features of the user for each of the plurality of individual frames to a corresponding plurality of neural networks; and
   identifying a highest scoring state of the plurality of states from aggregated output values of the plurality of neural networks.

7. The method of claim 1, further comprising providing an identification of the classified state of the video stream to a remote computing device.

8. The method of claim 7, wherein the video stream is not provided to the remote computing device.

9. A system for extraction of nonverbal communication data from video, comprising:
   a computing device comprising a processor and a camera;
   wherein the camera is configured to capture a video stream of a user; and
   wherein the processor is configured to:
      select a plurality of individual frames of the video stream,
      for each of the plurality of individual frames of the video stream:
         extract a plurality of features;
         identify, from the extracted plurality of features for a frame of the plurality of individual frames, a plurality of points corresponding to physical features of the user at identified positions within the frame; and
         identify, from the extracted plurality of features, a pose of the user, and
      classify, via a neural network from the identified poses of the user for the plurality of individual frames of the video stream, the video stream as showing one of a predetermined plurality of states by providing an array comprising identified positions of points corresponding to a physical feature of the user for each of the plurality of individual frames to the neural network, and identifying a highest scoring state of the plurality of states from output values of the neural network.

10. The system of claim 9, wherein the processor is further configured to downsample the video stream at a predetermined rate, and select the plurality of individual frames from consecutive frames of the downsampled video stream.

11. The system of claim 9, wherein the processor is further configured to process each frame of the plurality of individual frames with a convolutional neural network.

12. The system of claim 9, wherein the processor is further configured to perform an edge detection and dimensional reduction on each frame of the plurality of individual frames.

13. The system of claim 9, wherein the processor is further configured to:
provide a plurality of arrays comprising identified positions of points corresponding to different physical features of the user for each of the plurality of individual frames to a corresponding plurality of neural networks; and
identify a highest scoring state of the plurality of states from aggregated output values of the plurality of neural networks.

14. The system of claim 9, wherein the processor is further configured to provide an identification of the classified state of the video stream to a remote computing device.

15. The system of claim 14, wherein the video stream is not provided to the remote computing device.

16. A non-transitory computer-readable medium comprising instructions that, when executed by a processor of a computing device, cause the processor to perform operations comprising:
retrieving, from a camera of the computing device, a video stream of a user;
selecting a plurality of individual frames of the video stream;
for each of the plurality of individual frames of the video stream:
extracting a plurality of features,
identifying, from the extracted plurality of features for a frame of the plurality of individual frames, a plurality of points corresponding to physical features of the user at identified positions within the frame; and
identifying, from the extracted plurality of features, a pose of the user, and
classifying, via a neural network from the identified poses of the user for the plurality of individual frames of the video stream, the video stream as showing one of a predetermined plurality of states by providing an array comprising identified positions of points corresponding to a physical feature of the user for each of the plurality of individual frames to the neural network, and identifying a highest scoring state of the plurality of states from output values of the neural network.

\* \* \* \* \*